J. B. BECKER.
POWER TRANSMISSION DEVICE.
APPLICATION FILED AUG. 5, 1919.
1,373,790.
Patented Apr. 5, 1921.
3 SHEETS—SHEET 2.
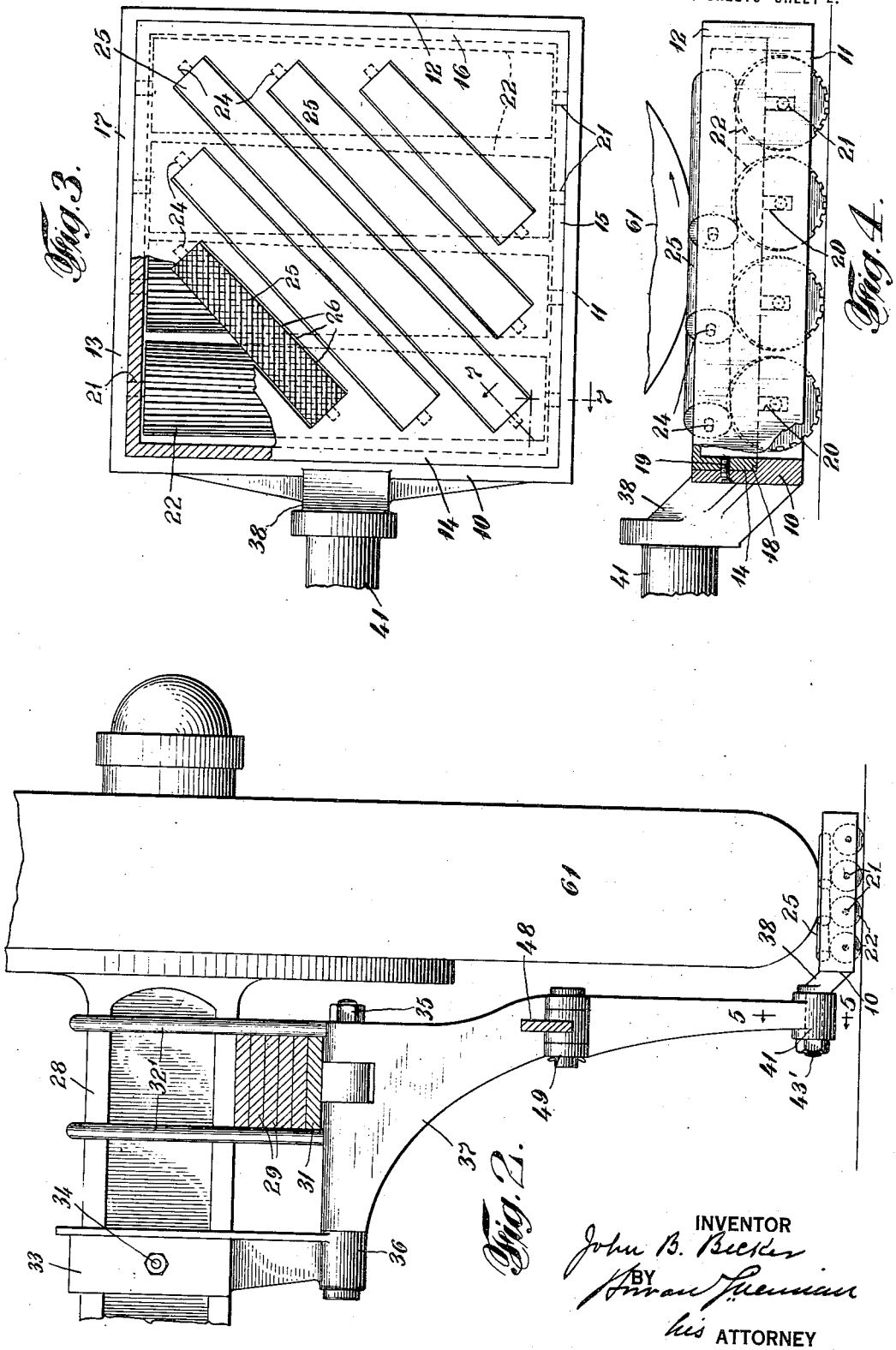

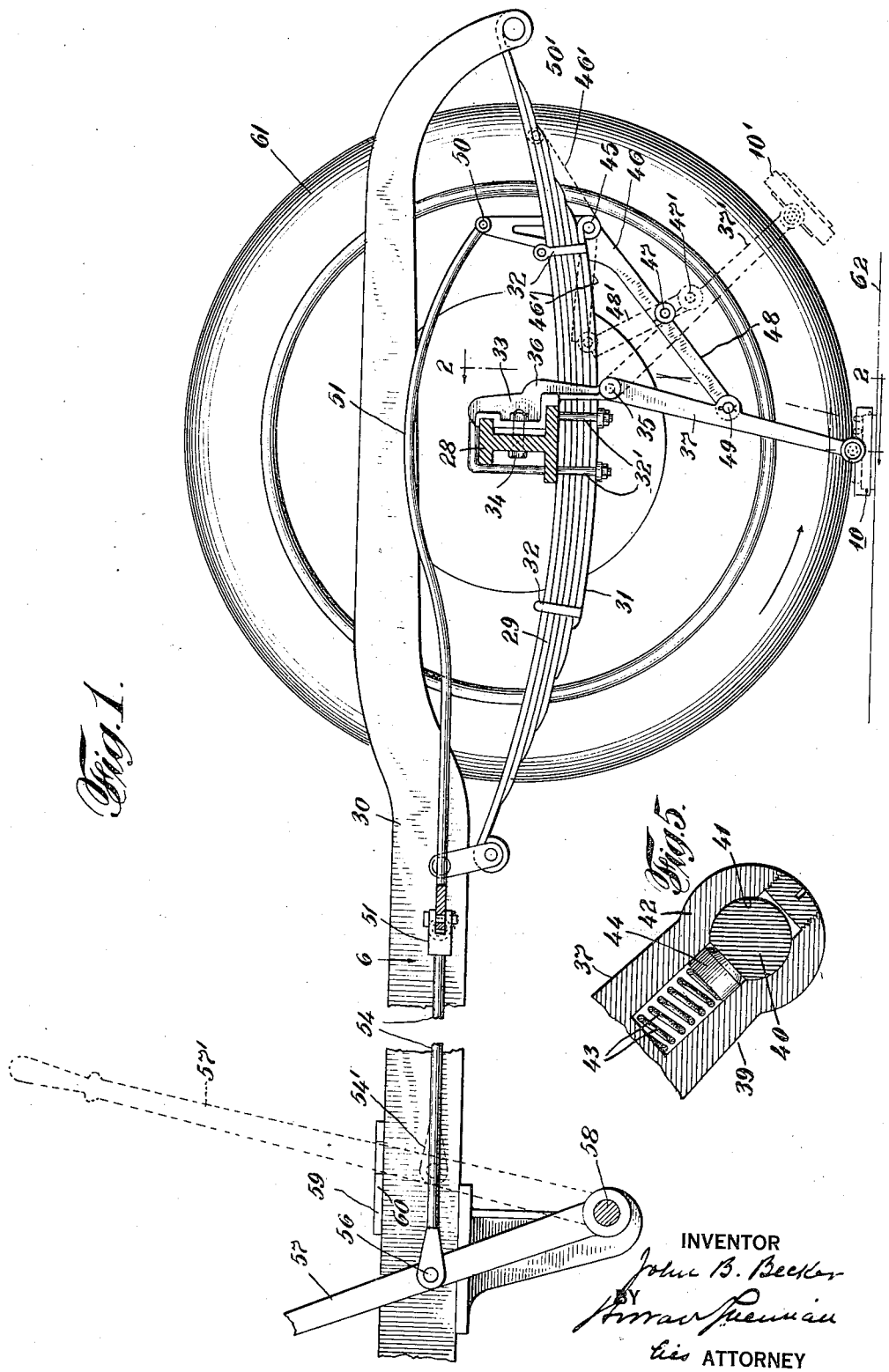

J. B. BECKER.
POWER TRANSMISSION DEVICE.
APPLICATION FILED AUG. 5, 1919.
1,373,790.
Patented Apr. 5, 1921.
3 SHEETS—SHEET 3.
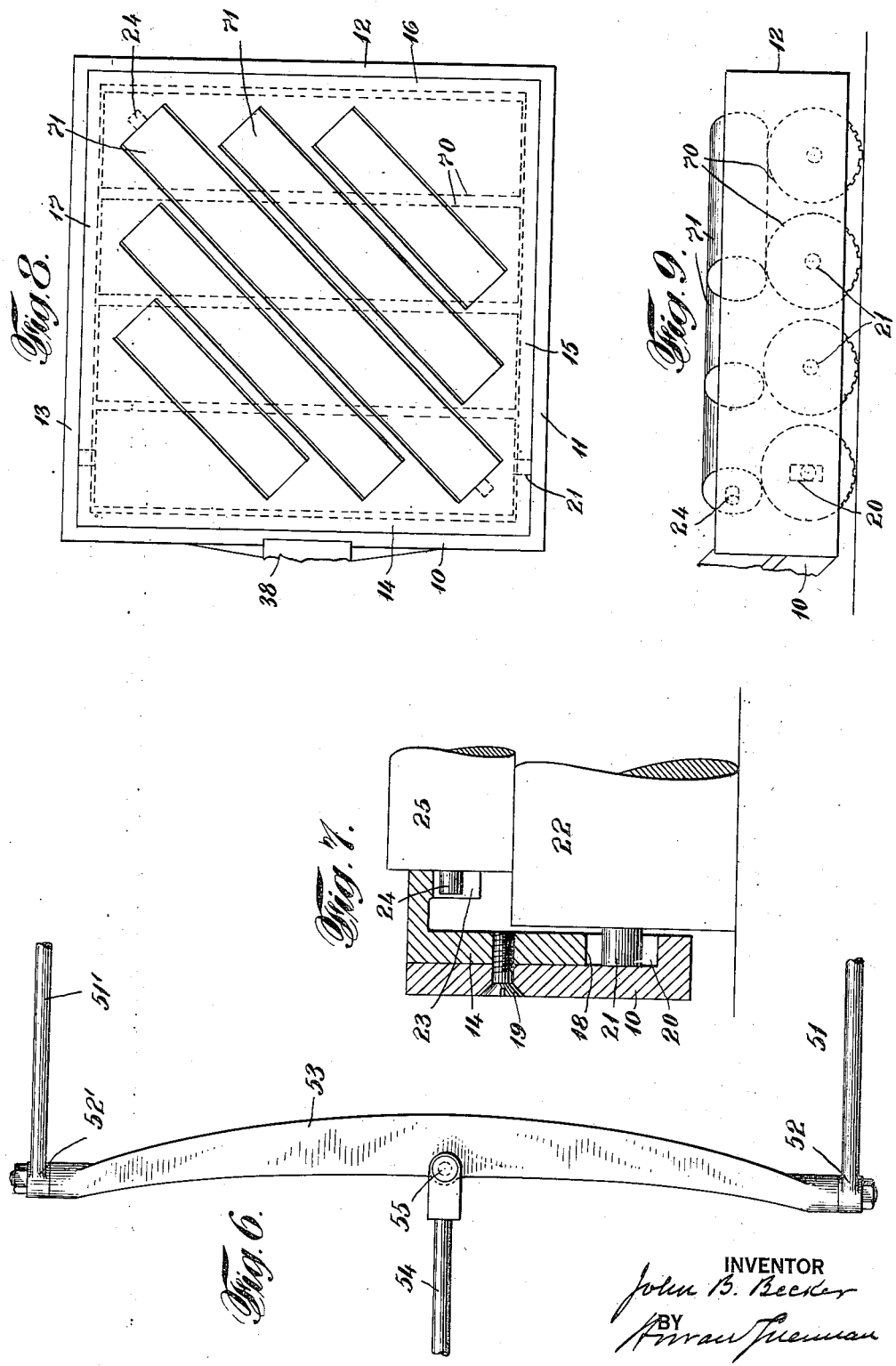

UNITED STATES PATENT OFFICE.

JOHN B. BECKER, OF NEW YORK, N. Y.

POWER-TRANSMISSION DEVICE.

1,373,790.    Specification of Letters Patent.    Patented Apr. 5, 1921.

Application filed August 5, 1919. Serial No. 315,433.

*To all whom it may concern:*

Be it known that I, JOHN B. BECKER, a citizen of the United States, residing in the city of New York, county of New York, borough of Manhattan, and State of New York, have invented certain new and useful Improvements in Power-Transmission Devices, of which the following is a full, clear, and exact specification.

My invention relates to power transmission devices and refers particularly to devices of such a construction that when a moving body abuts thereon it will cause the device to move in a direction other than the movement of the moving body.

My invention is a device comprising upper and lower revoluble abutting members, so arranged and constructed that the revolution of the upper members will cause the device to move in a plane other than the revoluble direction of the other members.

The device of my invention may also be constructed of two series of revoluble abutting members, so arranged with respect to each other that the revolution of one series of members will revolve the other series in a direction divergent to that of the first series.

These and other objects of my invention will be evident upon a consideration of my drawings and specification.

In the transmission of power, it is frequently desirable to change, or shift, the position of a moving body during its movement, and this is usually accomplished by means of complicated gears, or similar mechanism, additional power and labor being necessary to operate the shifting mechanism.

My device overcomes these difficulties and presents a means whereby the position of the moving body may be shifted during the movement of the body, without the use of gears, or similar mechanisms, the moving body itself furnishing the power and means for accomplishing the shifting movement.

My device has many adaptations of use, and while I specifically describe its application to the movement of a vehicle, I, in no way limit myself to such application, as a consideration of the device will suggest many uses to which it is applicable.

In the accompanying drawings, illustrating modifications of my device, and an example of its application, similar parts are designated by similar numerals.

Figure 1 is a broken vertical cross-section, showing the application of my device to a vehicle.

Fig. 2 is a broken enlarged section through the line 2—2 of Fig. 1.

Fig. 3 is a top plan view, partly in section and with parts removed, of one form of my device.

Fig. 4 is a side elevation, broken away and partly in section, of Fig. 3.

Fig. 5 is a broken enlarged section through the line 5—5 of Fig. 2.

Fig. 6 is a broken view in the direction of the arrow 6 of Fig. 1.

Fig. 7 is a broken enlarged section through the line 7—7 of Fig. 3.

Fig. 8 is a top plan view, partly in section and with parts removed, of a modified form of my device.

Fig. 9 is a side elevation, broken away and partly in section, of Fig. 8.

The particular form of my device, shown in the accompanying drawings, comprises a supporting frame consisting of a lower frame and an upper frame. The lower frame comprises the sides 10, 11, 12 and 13, connected together by any suitable means. The upper frame comprises the sides 14, 15, 16 and 17 connected together by any suitable means. The upper frame fits within the lower frame and is supported therein upon a recess 18 within the inner faces of the sides of the lower frame. The two frames are connected to each other by a series of screws 19. Two opposite sides of the lower frame have a series of recesses 20, 20 in alinement with each other and capable of receiving the shaft ends 21, 21 of a series of conical rollers 22, 22 and allowing the shafts to be revoluble therein. When the upper frame is placed within the lower frame, the sides of the former extend across the recesses 20, 20, preventing the rollers 22, 22 from displacement. Two opposite sides of the upper frame have a series of recesses 23, 23 in alinement with each other and capable of receiving the shaft ends 24, 24 of a series of cylindrical rollers 25, 25 and allowing the shafts to be revoluble therein. When the upper frame and the lower frame are assembled, the abutment of the rollers 25, 25 upon the rollers 22, 22 prevents the former from displacement from the recesses 23, 23.

The lower rollers 22, 22 extend beyond the lower frame, thus preventing the frame from abutting upon the surface upon which the rollers 22, 22 rest. The upper rollers 25, 25 extend above the upper frame.

The axes of rotation of the rollers 25, 25 are at an angle of 45 degrees from the axes of rotation of the rollers 22, 22. The surface of each roller 22 is fluted longitudinally in the direction of the axis of rotation and the extended portions of the faces thereof are knurled. Each upper roller 25, 25 is fluted at 26 spirally in order that the flutings of each roller 25 will be in alinement, or parallel with the flutings in the under roller 22, 22 at the line of abutment.

It is evident from the above description that if the device is placed upon a smooth surface, such as a floor, and an object be moved across the rollers 25, 25 with sufficient downward pressure to revolve the rollers, that the abutment of the rollers 25, 25 upon the rollers 22, 22 will cause the latter to revolve, thus moving the device and the moving object thereon, the device always moving in the plane of an arc.

If, for example, a revoluble wheel revolves upon the upper rollers 25, 25, the axis of rotation of the wheel being at right angles to the axes of rotation of the lower rollers 22, 22, the revoluble movement of the wheel will revolve the upper rollers 25, 25, which, in turn, will revolve the lower rollers 22, 22, which, being in abutment with the floor, will carry the device and the wheel in a direction at an angle to the axis of rotation of the wheel.

The adaptation of my device to use with an automobile illustrated in the accompanying drawings, shows one method of its attachment and method of use.

The rear axle 28 of the automobile carries the usual leaf-spring 29 which is attached to the side chassis frame 30 in the usual manner. A resilient member 31 preferably similar to a spring leaf abuts upon the lower face of the spring 29 and is fixedly attached thereto by means of the retaining straps 32, 32, integral with the member 31, the member 31 being still more firmly maintained in its position by the spring clips 32', 32', passing over the axle 28. The inner face of the supporting member 33 agrees with the contour of the face of the axle 28 and abuts thereon and is affixed thereto by the bolt 34. A bolt 35 passes through the portion 36 of the member 33 and acts as a hinge whereon the arm 37 is revoluble. The lower end of the arm 37 carries the member 38 integral therewith, attached to the lower frame 10 of the power transmission device. Fig. 5 illustrates a method whereby the power transmission device will be maintained at right angles to the arm 37 when the device is not in use, but which will allow of a variation of this angle when the device is in use. The arm 37 is recessed 39 at its lower portion, a hole 40 being through the arm 37, the axis of which is at right angles to the axis of the recess 39. The annular portion 41 of the member 38 is flattened upon one side 42, is inserted in the hole 40 and maintained therein by the nut 43' threaded on the portion 41. A spiral spring 43 is carried within the recess 39, one end of which abuts upon the follower 44, the abutment of the latter upon the flat surface 42 of the member 41 having a tendency to maintain the latter so that the power transmission device will be normally held at right angles to the arm 37.

The ring portion 45 of the member 31 acts as a pivotal point for the arm 46, the lower end of which is knee-jointed at 47 to the arm 48, which, in turn, is pivotally attached at 49 to the arm 37. The upper end of the arm 46 is pivotally attached at 50 to the rod 51 extending longitudinally of the vehicle. The rod 51 is pivotally attached at 52 to one end of a yoke 53, the other end of which is pivotally attached at 52' to a rod 51'. The rod 54 pivotally attached to the yoke 53 at 55 is also pivotally attached at 56 to the lever 57, which, in turn, is revoluble upon the shaft, or pin, 58. A lock plate 59, having a recess 60, is so situated that the resiliency of the lever 57 will cause it to become inserted therein thus locking the lever 57 from accidental movement, but allowing the lever to be withdrawn from the recess 60 when desired for movement.

A wheel 61 is carried by the axle 28.

The rod 51' is connected to elements similar in their construction and arrangements upon the opposite side of the vehicle, so that the movement of the rod 54 will cause equal movement of parts upon both sides of the vehicle.

When the lever 57 is in the position shown in Fig. 1, the device will be in the positions shown in full lines in the drawings.

The rear wheels 61, 61 will therefore rest upon the upper rollers 25, 25 of the devices which will be supported upon the surface 62 by the lower rollers 22, 22. If now the wheels 61, 61 be revolved in the direction of the arrow, the rollers 25, 25 will be revolved, revolving the rollers 22, 22, and if the pitch of the rollers 22, 22 correspond to the wheel base of the vehicle, the device and the wheels 61, 61 will move in the direction of an arc, the center of which will be the center of the front axle of the vehicle, thus giving the vehicle a pivotal movement.

It is evident that if the wheels 61 be revolved in an opposite direction, the rear portion of the vehicle will move in the reverse direction, describing a reverse arc.

The device of my invention, as thus applied, is particularly valuable in lining up a vehicle against a pavement curb, where the space capable of being occupied is short due to the presence of other vehicles. In this case the vehicle can be driven into the space at an oblique angle until the front wheels are properly positioned and the rear of the vehicle may be then moved sidewise into the desired position parallel to the curb.

When it is desired to remove the device from abutment with the wheels 61, 61, the lever 57 is moved into the position 57', shown in dotted lines, and the other elements of the device will be positioned, as shown in dotted lines, similar parts being designated by prime numerals.

The modification of my device, shown in Figs. 8 and 9, is similar to that shown in Figs. 3 and 4, except that the conical rollers 22, 22, 25, 25 of the latter are replaced by cylindrical rollers 70, 70, 71, 71 respectively. As the lower rollers 70, 70 are cylindrical, they will give the device a movement at right angles to the plane of rotation of the wheel 61.

In addition to the use indicated above, my device may be applied to many purposes where a change in the direction of power transmission is desired, among which I mention the shifting of belts, change in the direction of conveyers, etc.

I do not limit myself to the particular size, shape, number or arrangement of parts, as shown and described, all of which may be varied without going beyond the scope of my invention as shown, described and claimed.

What I claim is:—

1. In a vehicle moving device, in combination, a series of revoluble rollers; a second series of revoluble rollers abutting upon the first series, the axes of the two series of rollers being greater than 0° with respect to each other, means for revolubly supporting the rollers, and means whereby the revolution of a vehicle's wheels resting upon the rollers will cause a movement of the device and the vehicle in a direction at variance with the direction of rotation of the vehicle's wheels.

2. In a vehicle moving device, in combination, means for revolubly supporting two series of revoluble rollers; a series of revoluble rollers extending beyond the supporting means, a second series of revoluble rollers abutting upon the first series and extending beyond the supporting means, the axes of the two series of rollers being greater than 0° with respect to each other, and means whereby the revolution of a vehicle's wheels resting upon the rollers will cause a movement of the device and the vehicle in a direction at variance with the direction of rotation of the vehicle's wheels.

3. In a vehicle moving device, in combination, a series of revoluble fluted rollers; a second series of fluted revoluble rollers abutting upon the first series, the axes of the two series of rollers being greater than 0° with respect to each other, means for revolubly supporting the rollers, and means whereby the revolution of a vehicle's wheels resting upon the rollers will cause a movement of the device and the vehicle in a direction at variance with the direction of rotation of the vehicle's wheels.

4. In a vehicle moving device, in combination, means for revolubly supporting two series of revoluble rollers; a series of revoluble fluted rollers extending beyond the supporting means, a second series of revoluble fluted rollers abutting upon the first series and extending beyond the supporting means, the axes of the two series of rollers being greater than 0° with respect to each other, and means whereby the revolution of a vehicle's wheels resting upon the rollers will cause a movement of the device and the vehicle in a direction at variance with the direction of rotation of the vehicle's wheels.

5. In a vehicle moving device, in combination, a series of revoluble fluted rollers; a second series of revoluble fluted rollers abutting upon the first series of rollers, the flutings of the two series of rollers being in alinement at the line of abutment, the axes of the two series of rollers being greater than 0° with respect to each other, means for revolubly supporting the rollers, and means whereby the revolution of a vehicle's wheels resting upon the rollers will cause a movement of the device and the vehicle in a direction at variance with the direction of rotation of the vehicle's wheels.

6. In a vehicle moving device, in combination, means for revolubly supporting two series of revoluble fluted rollers; a series of revoluble fluted rollers extending beyond the supporting means, a second series of revoluble fluted rollers abutting upon the first series of rollers and extending beyond the supporting means, the flutings of the two series of rollers being in alinement at the line of abutment, the axes of the two series of rollers being greater than 0° with respect to each other, and means whereby the revolution of a vehicle's wheels resting upon the rollers will cause a movement of the device and the vehicle in a direction at variance with the direction of rotation of the vehicle's wheels.

7. In a vehicle moving device, in combination, a series of revoluble fluted conical rollers; a second series of revoluble fluted conical rollers abutting upon the first series of rollers, the flutings of the two series of rollers being in alinement at the line of abutment, the axes of the two series of rollers being greater than 0° with respect to each other, means for revolubly supporting the rollers, and means whereby the revolution of a vehicle's wheels resting upon the rollers will cause a movement of the device and the direction of rotation of the vehicle's wheels.

8. In a vehicle moving device, in combination, means for revolubly supporting two series of revoluble fluted rollers; a series of revoluble fluted conical rollers extending beyond the supporting means, a second series of revoluble fluted conical rollers abutting upon the first series of rollers and extending beyond the supporting means, the flutings of the two series of rollers being in alinement at the line of abutment, the axes of the two series of rollers being greater than 0° with respect to each other, and means whereby the revolution of a vehicle's wheels resting upon the rollers will cause a movement of the device and the vehicle in a direction at variance with the direction of rotation of the vehicle's wheels.

9. In a vehicle moving device, in combination, means for revolubly supporting two series of revoluble rollers; a series of revoluble fluted rollers extending beyond the supporting means; a second series of revoluble fluted rollers abutting upon the first series and extending beyond the supporting means, the axes of the two series of rollers being greater than 0° with respect to each other; a vehicle; means for attaching the device to the vehicle; means whereby the device may be situated between the wheels of the vehicle and the road surface and removed therefrom, and means whereby the revolution of a vehicle's wheels resting upon the rollers will cause a movement of the device and the vehicle in a direction at variance with the direction of rotation of the vehicle's wheels.

10. In a vehicle moving device, in combination, means for revolubly supporting two series of revoluble fluted rollers; a series of revoluble fluted rollers extending beyond the supporting means; a second series of revoluble fluted rollers abutting upon the first series of rollers and extending beyond the supporting means, the flutings of the two series of rollers being in alinement at the line of abutment, the axes of the two series of rollers being greater than 0° with respect to each other; a vehicle; means for attaching the device to the vehicle, means whereby the device may be situated between the wheels of the vehicle and the road surface and removed therefrom, and means whereby the revolution of a vehicle's wheels resting upon the rollers will cause a movement of the device and the vehicle in a direction at variance with the direction of rotation of the vehicle's wheels.

11. In a vehicle moving device, in combination, means for revolubly supporting two series of revoluble fluted rollers; a series of revoluble fluted conical rollers extending beyond the supporting means; a second series of revoluble fluted conical rollers abutting upon the first series of rollers and extending beyond the supporting means, the flutings of the two series of rollers being in alinement at the line of abutment, the axes of the two series of rollers being greater than 0° with respect to each other; a vehicle; means for attaching the device to the vehicle, means whereby the device may be situated between the wheels of the vehicle and the road surface and removed therefrom, and means whereby the revolution of a vehicle's wheels resting upon the rollers will cause a movement of the device and the vehicle in a direction at variance with the direction of rotation of the vehicle's wheels.

12. In a vehicle moving device, in combination, a series of revoluble fluted rollers, a second series of revoluble fluted rollers meshing with the first series, the axes of the two series of rollers being greater than 0° with respect to each other, and means whereby the revolution of a vehicle's wheels resting upon the rollers will cause a movement of the device and the vehicle in a direction at variance with the direction of rotation of the vehicle's wheels.

13. In a vehicle moving device, in combination, means for revolubly supporting two series of revoluble fluted rollers, a series of revoluble fluted rollers extending beyond the supporting means, a second series of revoluble fluted rollers meshing with the first series and extending beyond the supporting means, the axes of the two series of rollers being greater than 0° with respect to each other, and means whereby the revolution of a vehicle's wheels resting upon the rollers will cause a movement of the device and the vehicle in a direction at variance with the direction of rotation of the vehicle's wheels.

14. In a vehicle moving device, in combination, means for revolubly supporting two series of revoluble fluted rollers, a series of revoluble fluted rollers extending beyond the supporting means, a second series of revoluble fluted rollers meshing with the first series and extending beyond the supporting means, the revolution of one series of rollers causing the device to move over a surface upon which the second series of rollers rest in a direction greater than 0° with respect to the axes of the second series of rollers, and means whereby the revolution of a vehicle's wheels resting upon the rollers will cause a movement of the device and the vehicle in a direction at variance with the direction of rotation of the vehicle's wheels.

Signed at New York city in the county of New York and State of New York this 31st day of July, 1919.

JOHN B. BECKER.